(12) United States Patent
Ham et al.

(10) Patent No.: US 12,494,814 B2
(45) Date of Patent: Dec. 9, 2025

(54) LARGE INSTANTANEOUS BANDWIDTH RADIO FREQUENCY FRONT-END FOR WIRELESS SYSTEMS

(71) Applicant: Massive Light, LLC, Spring, TX (US)

(72) Inventors: Ronald E. Ham, Austin, TX (US); David Henderson, Austin, TX (US); Travis Eubanks, San Antonio, TX (US)

(73) Assignee: Massive Light, LLC, Spring, TX (US)

( * ) Notice: Subject to any disclaimer, the term of this patent is extended or adjusted under 35 U.S.C. 154(b) by 615 days.

(21) Appl. No.: 17/980,642

(22) Filed: Nov. 4, 2022

(65) Prior Publication Data
US 2023/0059120 A1 Feb. 23, 2023

Related U.S. Application Data

(63) Continuation of application No. 17/300,416, filed on Jun. 23, 2021, now Pat. No. 11,496,176.

(60) Provisional application No. 63/044,423, filed on Jun. 26, 2020, provisional application No. 63/042,758, filed on Jun. 23, 2020.

(51) Int. Cl.
| | |
|---|---|
| *H04B 1/40* | (2015.01) |
| *H01Q 5/55* | (2015.01) |
| *H01Q 13/02* | (2006.01) |
| *H04B 1/707* | (2011.01) |
| *H04B 1/713* | (2011.01) |

(52) U.S. Cl.
CPC ............ *H04B 1/40* (2013.01); *H01Q 5/55* (2015.01); *H01Q 13/02* (2013.01)

(58) Field of Classification Search
None
See application file for complete search history.

(56) References Cited

U.S. PATENT DOCUMENTS

| | | | | |
|---|---|---|---|---|
| 5,436,935 | A * | 7/1995 | Bernhard | H04B 1/7085 370/515 |
| 5,841,808 | A * | 11/1998 | Rizzo | H04B 1/7085 375/150 |
| 6,463,091 | B1 * | 10/2002 | Zhodzicshsky | G01S 19/30 375/150 |
| 6,496,533 | B2 * | 12/2002 | Lennen | H04B 1/7075 375/E1.003 |

(Continued)

OTHER PUBLICATIONS

U.S. Appl. No. 17/300,418, filed Jun. 23, 2021, Travis Eubanks.

*Primary Examiner* — Tuan A Tran (57) ABSTRACT

The disclosed principles provide for an RF front-end design capable of up-converting, down-converting, and conditioning broadband signals for wireless transmission with an instantaneous bandwidth of up to 3.5 GHz within the frequency range of 2-12 GHz. In addition, embodiments of the disclosed principles provide flexibility that enables RF front-ends designed as disclosed herein to be applied to many different applications including covert communications, drone communications, high data rate communications, signals intelligence, direction finding, multi-function apertures, radars and emulators, and electronic warfare. Embodiments and their related advantages and improvements of RF front-ends designed in accordance with the disclosed principles are discussed herein.

20 Claims, 6 Drawing Sheets

(56) References Cited

U.S. PATENT DOCUMENTS

| | | | |
|---|---|---|---|
| 6,865,215 B1 * | 3/2005 | Russell | H04B 7/2621 |
| | | | 375/135 |
| 6,967,974 B1 * | 11/2005 | Partyka | H04L 7/046 |
| | | | 370/312 |
| 7,209,495 B2 * | 4/2007 | Partyka | H04W 52/0225 |
| | | | 370/312 |
| 7,224,713 B2 * | 5/2007 | Partyka | H04K 3/25 |
| | | | 375/135 |
| 7,224,720 B2 * | 5/2007 | Oishi | H04B 1/7075 |
| | | | 375/150 |
| 7,295,638 B2 * | 11/2007 | Martin | H04L 27/22 |
| | | | 375/348 |
| 7,358,828 B2 * | 4/2008 | Kato | H04L 27/364 |
| | | | 332/103 |
| 7,738,537 B2 * | 6/2010 | Fenton | G01S 19/30 |
| | | | 375/150 |
| 8,526,904 B2 * | 9/2013 | Gard | H04B 1/30 |
| | | | 455/318 |
| 8,928,546 B1 | 1/2015 | Eubanks et al. | |
| 9,065,537 B2 * | 6/2015 | Georgantas | H04B 17/14 |
| 9,136,899 B2 * | 9/2015 | Chakraborty | H04B 1/40 |
| 9,270,301 B2 * | 2/2016 | Väisänen | H04B 1/406 |
| 9,385,774 B2 * | 7/2016 | Chakraborty | H04W 52/02 |
| 9,729,254 B1 * | 8/2017 | Zhou | H03D 7/165 |
| 10,431,893 B1 | 10/2019 | Sethi et al. | |
| 10,916,855 B1 | 2/2021 | Rivera et al. | |
| 2009/0227214 A1 | 9/2009 | Georgantas et al. | |
| 2017/0025750 A1 | 1/2017 | Su et al. | |
| 2021/0044325 A1 | 2/2021 | Scherz et al. | |
| 2021/0091784 A1 | 3/2021 | Tseng et al. | |

\* cited by examiner

LARGE INSTANTANEOUS BANDWIDTH RADIO FREQUENCY FRONT-END FOR WIRELESS SYSTEMS

RELATED APPLICATIONS

The present disclosure is a continuation application of U.S. application Ser. No. 17/300,416, filed Jun. 23, 2021, now U.S. Pat. No. 11,496,176, issued Nov. 8, 2022, which claims priority to U.S. Provisional Patent Application No. 63/042,758, filed Jun. 23, 2020, and U.S. Provisional Patent Application No. 63/044,423, filed Jun. 26, 2020, all of which are incorporated herein by reference in their entireties for all purposes. The present disclosure is also related to commonly owned U.S. patent application Ser. No. 17/300,418, filed Jun. 23, 2021, which is also incorporated herein by reference in its entirety for all purposes.

STATEMENT REGARDING FEDERALLY SPONSORED RESEARCH OR DEVELOPMENT

The present disclosure includes important technology that, while not developed through federally sponsored research or development, provides crucial military advantages employable by the Department of Defense of the United States of America in the areas of covert and anti-jam communications, signals intelligence including direction finding of signals, satellite communications, radars and emulators, drone-to-ground communications, force collaboration for reduced deployment cost, and electronic warfare. However, disclosure of the technology described herein to enemies of the U.S. would likely negate the unique strategic advantages provided by this technology. Therefore, in view of ongoing development discussions between the Assignee of the present disclosure and multiple Defense Agencies of the U.S., a Secrecy Order for the present application, as well as the co-pending related application identified above, is strongly advised and is hereby requested.

TECHNICAL FIELD

The present disclosure relates generally to wireless systems, and more particularly relates to circuitry and related techniques for transmission and reception of signals with a large instantaneous bandwidth.

BACKGROUND

Wireless systems need radio frequency (RF) front-ends to translate baseband signals into conditioned signals that can be wirelessly broadcast and received through an antenna. The RF front-end takes baseband signals and shifts them to higher carrier frequencies that can pass efficiently through an antenna. The RF front-end also receives carrier frequency signals from the antenna and shifts them down in frequency to baseband signals. While converting signals upwards and downwards in frequency, the RF front-end also filters out undesirable harmonics and noise while amplifying the intended signals to be transmitted or received. In some direct digital synthesis (DDS) wireless systems, signals can be generated and received by the digital-to-analog converter (DAC) and analog-to-digital converter (ADC) at frequencies suitable for wireless broadcast, removing the need for a mixing stage in the RF front-end that provides signal conditioning and amplification.

Conventional RF front-ends are custom designed for a bandwidth in a specific frequency range to limit the implementation cost and minimize noise allowed into the receiver from interfering signals. One conventional example of an RF front-end is found inside of a cellular telephone between the phone's antenna and its digital signal processor. However, conventional RF front-ends exhibit frequency limitations that prevent them from being able to meet the high throughput and low probability of detection needs of emerging wireless systems. This is because they do not enable the usage of a large enough instantaneous bandwidth. Typical software-defined radio systems that are common today only enable up to 0.1 GHz of instantaneous bandwidth per channel, requiring the user to add more channels if more bandwidth is desired. In order to provide a larger desirable instantaneous bandwidth, such as up to 3.5 GHz, conventional systems would require 35 channels (0.1 GHz×35=3.5 GHz) of filters, amplifiers, mixers, and antennas in addition to added complexity in the digital signal processor to combine all 35 of those channels into a coherent signal.

Accordingly, what is needed in the art is an RF front-end that can flexibly enable multiple GHz of instantaneous bandwidth across a flexible frequency range without the need to add such additional channels in manner currently found in conventional RF front-end circuitry. The disclosed principles provide such an RF front-end that does not suffer from the deficiencies of conventional designs.

SUMMARY

The disclosed principles provide for an RF front-end design capable of up-converting, down-converting, and conditioning broadband signals for wireless transmission with an instantaneous bandwidth of up to 3.5 GHz within the frequency range of 2-12 GHz. In addition, embodiments of the disclosed principles provide flexibility that enables RF front-ends designed as disclosed herein to be applied to many different applications including covert communications, drone communications, high data rate communications, signals intelligence, direction finding, multi-function apertures, radars and emulators, and electronic warfare. Embodiments and their related advantages and improvements of RF front-ends designed in accordance with the disclosed principles are discussed in detail below.

In one embodiment, an RF front-end in accordance with the disclosed principles may comprise a receiver comprising an RF input configured to receive an analog RF input signal and a demodulator. In this embodiment, the demodulate may comprise a power divider configured to divide a received analog RF input signal into an I-channel component and a Q-channel component, and a first phase quadrature device providing phase separation between the I and Q channel components. Such a receiver may also comprise a first coding mixer configured to mix a first coding input signal and a signal from a first synthesizer comprising the center frequency of the RF input signal to generate a first code injected signal, and a first local oscillator gain amplifier driving the first phase quadrature device based on the first code injected signal or the signal from the first synthesizer. The receiver in this exemplary embodiment may also include receiver outputs providing the I-channel and Q-channel components to an analog-to-digital converter (ADC).

Also in such an exemplary embodiment, a RF front-end as disclosed herein comprises a transmitter having a first transmitter input receiving an I-channel component and a Q-channel component for an analog RF output signal from a digital-to-analog converter (DAC), as well as a modulator. The modulator may comprise a second phase quadrature device providing phase separation between the I and Q channel components, and a power combiner configured to combine the I-channel and Q-channel components into the analog RF output signal. The transmitter may further include a second coding mixer configured to mix a second coding input signal and a signal from a second synthesizer comprising the center frequency of the RF output signal to generate a second code injected signal, and a second local oscillator gain amplifier driving the second phase quadrature device based on the second code injected signal or the signal from the second synthesizer. The transmitter in this exemplary embodiment may also include an RF output configured to transmit the analog RF output signal.

BRIEF DESCRIPTION OF THE DRAWINGS

The novel features believed characteristic of the disclosure are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

The various embodiments of the presently disclosed subject matter are described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies. The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, similar components that are developed after development of the presently disclosed subject matter.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Also, the use of terms herein such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

Figure 1:
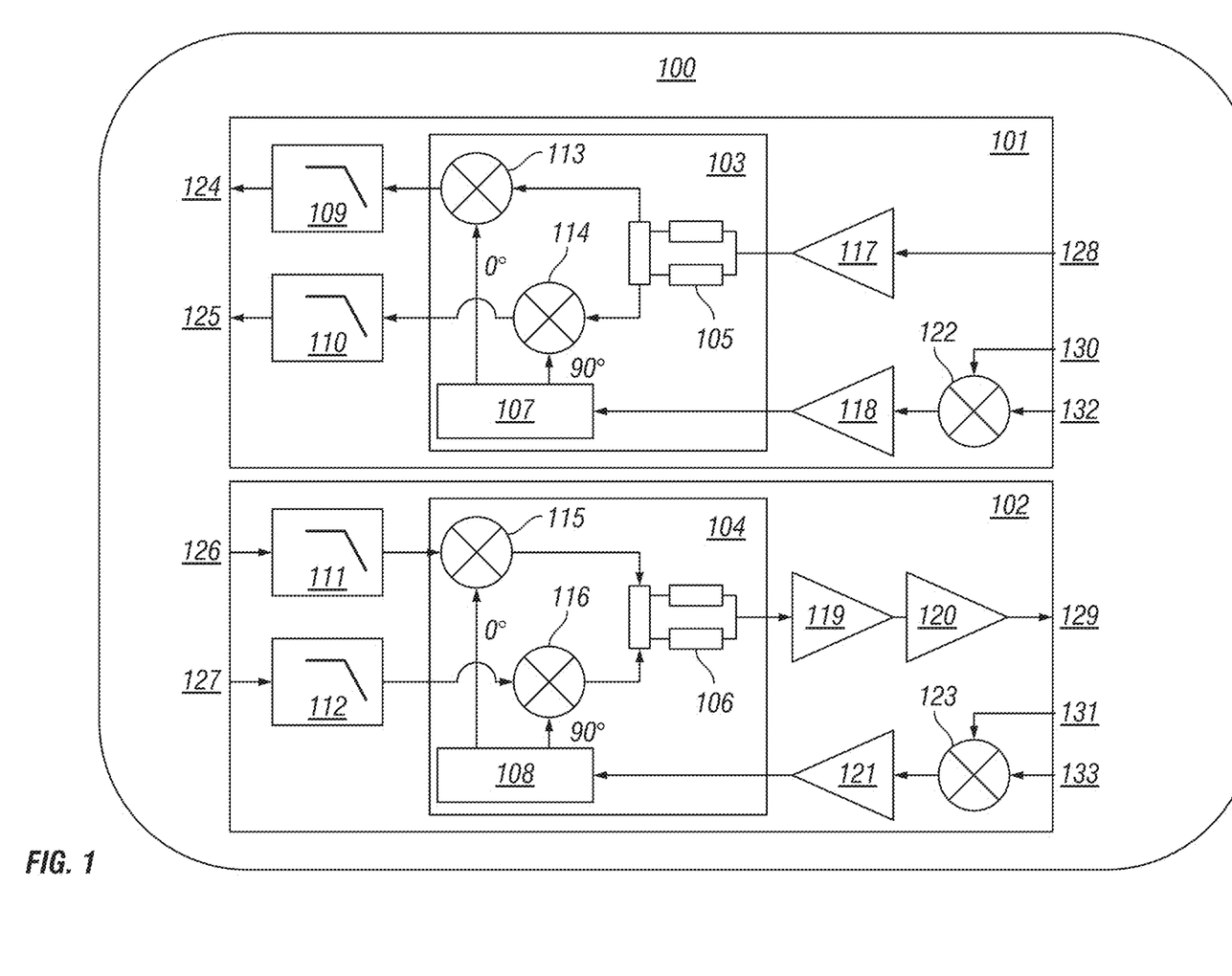
FIG. 1 illustrates a block diagram of exemplary RF front-end circuitry, including one or more critical sub-components, in accordance with the disclosed principles.

Looking initially at FIG. 1, illustrated is a block diagram of an RF Front-end 100 in accordance with the disclosed principles. The novel RF Front-end 100 enables an I/Q transceiver with the ability to transmit and receive single side-band signals across a relatively large instantaneous bandwidth (for example, up to 3.5 GHz) within a frequency selectable range of 2-12 GHz. The transceiver can operate in simplex, half-duplex, or full-duplex mode depending on the connections to the attached antennas and the frequencies selected by a first synthesizer 132 and second synthesizer 133. The RF Front-end 100 is composed of the receiver 101 and the transmitter 102, which are designed to be semi-symmetric for cost reduction and multi-channel scalability. Multiple receivers 101 and transmitters 102 can be used in cooperation with each other to create beam-forming transmit and receive communications systems (see FIGS. 2 and 3 below). The exemplary RF Front-end 100 illustrated in FIG. 1 has three outputs and seven inputs; however, other embodiments may include more or less outputs and/or inputs without departing from the scope of the disclosed principles.

Looking at the external connections for the RF Front-end 100, first output 124 from the receiver 101 connects externally to the I-channel of an analog-to-digital converter (ADC) on a digital signal processing (DSP) system. Second output 125 connects externally to the Q-channel of an ADC on a DSP system. RF input 128 connects externally to either an optional transmit/receive switch or directly to a broadband antenna. For the external connections of the transmitter 102, first input 126 connects externally to the I-channel of a digital-to-analog converter (DAC) on a DSP system. Second input 127 connects externally to the Q-channel of a DAC on a DSP system. RF output 129 connects externally to either an optional transmit/receive switch or directly to a broadband antenna.

Additionally, the first and second optional inputs 130, 131 are provided for use in employing spread spectrum coding to the signals transmitted and received from the RF front-end 100. First optional coding input 130 connects externally to an optional spreading sequence signal generated by a DSP system. A first synthesizer 132 connects externally to a frequency synthesizer, which could be a voltage-controlled oscillator (VCO), an oven-controlled crystal oscillator (OCXO), or any other frequency generating device used to control the center frequency of the receiver 101. Second optional coding input 131 connects externally to an optional spreading sequence signal generated by a DSP system. A second synthesizer 133 connects externally to a secondary frequency synthesizer, which could also be a VCO, an OCXO, or any other frequency generating device used to control the center frequency of the transmitter 102. Having two separate external frequency synthesizer sources enables greater flexibility for transmission and reception schemes, as well as better environmental adaptability than conventional RF front-end designs. Including both the I and Q channels for this embodiment of an RF Front-end 100 according to the disclosed principles enables either greater throughput or better signal-to-noise ratio than RF front-ends that do not include both of these channels. The I and Q channels are orthogonal through the 90 degrees separation provided by the phase quadrature devices 107 and 108 that allow the I and Q channel paths to remain isolated from one another. If both the I and Q channels contain the same data, then the Signal-to-Noise Ratio (SNR) of the combined received signal in the receiver 101 is doubled. If the I and Q channels contain different data, then the throughput (Data Rate) of the channel is doubled.

Looking now at the internal connections for the receiver 101 inside the RF Front-end 100, the RF input 128 connects internally to a low-noise amplifier 117. The low-noise amplifier 117 connects to a demodulator 103, which is composed of a power divider 105, an I-channel mixer 113, a Q-channel mixer 114, and a first phase quadrature device 107 that provides both the 0° and 90° phase separation between the I and Q channels for first output 124 and second output 125 from the RF Front-end 100. The demodulator 103 connects to two filters 109, 110 that remove unwanted harmonics from the mixed signals passing through the mixers 113, 114 inside the demodulator 103. Those two filters 109, 110 connect to first output 124 and second output 125, respectively, of the RF Front-end 100 to filter these data channels individually.

First optional coding input 130 connects to an optional coding mixer 122 when an external signal is required for first optional coding input 130 in applications such as stealth communications or code division multiple access (CDMA) signal separation. For applications that do not require first optional coding input 130, the optional coding mixer 122 can be disabled with a direct current (DC) bias voltage to allow the first synthesizer 132 signal to pass through it, and the first optional coding input 130 can remain disconnected externally. The phase shift of the signal passing through the optional coding mixer 122 will be 0° for a positive DC bias and 180° for a negative DC bias. The first synthesizer 132 connects to and is mixed by the optional coding mixer 122 when the first optional coding input 130 is required. The mixed signal thereby becomes a code injected signal for driving the first local oscillator (LO) gain amplifier 118. When the first optional coding input 130 is not required, the first synthesizer 132 directly connects through by-passed coding mixer 122 to the LO gain amplifier 118 and thus drives the LO gain amplifier 118 simply with the output of the first synthesizer 132. The LO gain amplifier 118 connects to the demodulator 103 as an input to the first phase quadrature device 107 to drive it, either with the code injected signal when the encrypting first optional coding input 130 is employed, or with the frequency provided by the first synthesizer 132 when the first optional coding input 130 is not employed. The LO gain amplifiers 118 and 121 have been included in this design because many broadband mixers require a higher power LO signal than is provided by most frequency synthesizers. The phase quadrature devices 107 and 108 will have some loss that must be overcome by the LO gain amplifiers.

Looking now at the internal connections for transmitter 102 inside the RF Front-end 100, the I-channel first input 126 connects to the I-channel filter 111, which connects to the modulator 104. Similarly, the Q-channel second input 127 connects to the Q-channel filter 112, which connects to the modulator 104. The modulator 104 is composed of the same components as the demodulator 103, and the only difference between the two is the direction of signals through them. These components include an I-channel mixer 115, a Q-channel mixer 116, a second phase quadrature device 108, and a power combiner 106. The power combiner 106 inside the modulator 104 is composed of the same components and connections as the power divider 105 inside the demodulator 103. The modulator 104 connects to the pre-amplifier 119, the pre-amplifier 119 connects to the power amplifier 120, and the power amplifier 120 connects to the RF output 129.

Second optional coding input 131 connects to the second optional coding mixer 123 when an external signal is required for second optional coding input 131, again, such as when employing stealth communications or CDMA signal separation. For other applications not requiring second optional coding input 131, the optional coding mixer 123 can be disabled with a DC bias voltage to allow the second synthesizer 133 signal to pass through it, and the second optional coding input 131 can remain disconnected externally. The phase shift of the signal passing through the optional coding mixer 123 will be 0° for a positive DC bias and 180° for a negative DC bias. When the second optional coding input 131 is required, the second synthesizer 133 connects to the optional coding mixer 123, which mixes the second synthesizer 133 output with the signal from the second optional input 131. The mixed signal thereby becomes a code injected signal for driving the second local oscillator (LO) gain amplifier 121. When the second optional coding input 131 is not required, the second synthesizer 133 directly connects through the by-passed coding mixer 123 to the LO gain amplifier 121 and thus drives the LO gain amplifier 121 simply with the output of the second synthesizer 133. The LO gain amplifier 121 connects to the modulator 104 as an input to the second phase quadrature device 108 to drive it, either with the code injected signal when the encrypting second optional coding input 131 is employed, or with the frequency provided by the second synthesizer 133 when the second optional coding input 131 is not employed.

Broadly speaking, the disclosed principles provide for the transmission and receiving of encrypted RF signals through direct-sequence spread spectrum by mixing the pseudo-noise spreading sequence directly with the center frequencies (i.e., broadcast frequencies) generated by the first synthesizer 132 and the second synthesizer 133, creating the code injected driving signals for the LO gain amplifiers 118, 121, which is more efficient than traditional schemes that have been used in the past. Thus, the disclosed principles can spread code injection into a communication path via the transmitter and receiver local oscillators 118, 121 instead of by the usual baseband I/Q signals (data paths) or the RF path bi-phase modulator. In the illustrated RF front-end design, pseudo noise coding may be mixed with the synthesizer input using coding mixer 122 for the receiver to provide a code injected signal for use by the oscillator 118 to drive the first phase quadrature device 107. The same may be done for the oscillator 121 in the transmitter. This is done instead of mixing any coding with the data paths (I and Q channels) at the backend of the receiver 101 prior to the data channels being provided to the baseband for data processing as is found in conventional RF front-end designs. Alternatively, instead of using mixers on the I and Q data channels prior to processing, conventional designs may employ a more sophisticated, but extremely costly, FPGA to provide the coding for the security of the signals, but this is done on the I and Q data signals after being provided from the receiver or prior to being provided to a transmitter. However, either of these conventional approaches results in additional costs of hundreds or even thousands of dollars in the case of using FPGAs with coding capabilities, and results in the use of additional components (i.e., the two mixers for the I and Q channels in both the receiver and transmitter) that increase both cost and size of the conventional designs.

Thus, with the disclosed principles, the optional-use coding mixers 122, 123 placed to receive the signals from the first and second coding inputs 130, 131 for mixing with the frequency signals from the first and second synthesizers 132, 133 to produce the code injected drive signals eliminates the need for a mixer on each of the I and Q channels as is used in conventional designs. Traditional I/Q pseudo-noise spreading RF front-ends have required eight mixers total for a single-sideband operation, but the disclosed new and more efficient scheme has reduced the total mixers required from eight to six in both the receiver and transmitter, saving component cost and printed circuit board size. This increase in efficiency was accomplished by taking the pseudo-noise spreading process out of the I and Q channel paths (4 channels total) and putting it into the LO signal channels (2 channels total). And, as discussed above, these coding mixers 122, 123 and the optional coding inputs (130, 131) used to provide the pseudo-noise coding can be turned off when encrypted signals are not needed. As a result, not only does an RF front-end as disclosed herein provide a reduced cost and size advantage over conventional front-end capable of providing such signal coding, but disclosed RF front-ends provide the flexibility of switching off the spread spectrum signal encryption if desired. The number of mixers required within the demodulator 103 and modulator 104 was unaffected by the increase in efficiency created by mixing the pseudo-noise spreading sequence directly with the center frequencies generated by the first synthesizer 132 and the second synthesizer 133.

As a result, advantageous features of an RF Front-end 100 constructed in accordance with the disclosed principles include frequency flexibility within the 2-12 GHz range, application agnosticism for multi-purpose use, extreme instantaneous bandwidth (up to 3.5 GHz), symmetric design for simple debugging, miniaturized size, and reduced component and manufacturing costs. The extreme instantaneous bandwidth of an RF front-end as disclosed herein is enabled by careful selection of all of the sub-components in the RF front-end 100. Typically, RF front-ends do not enable such an extreme instantaneous bandwidth due to analog limitations in the antenna. However, the disclosed RF front-end with extreme instantaneous bandwidth has become practically useful due the invention of a large instantaneous bandwidth antenna described in co-pending U.S. Provisional Patent Application No. 63/044,423, filed Jun. 26, 2020, and co-pending U.S. patent application Ser. No. 17/300,418, filed Jun. 23, 2021, both herein incorporated by reference in their entireties for all purposes. Moreover, an RF front-end as disclosed herein could shift in frequency range relative to the components chosen inside the RF front-end 100 to accommodate any other antenna design that may be relevant.

Figure 2:
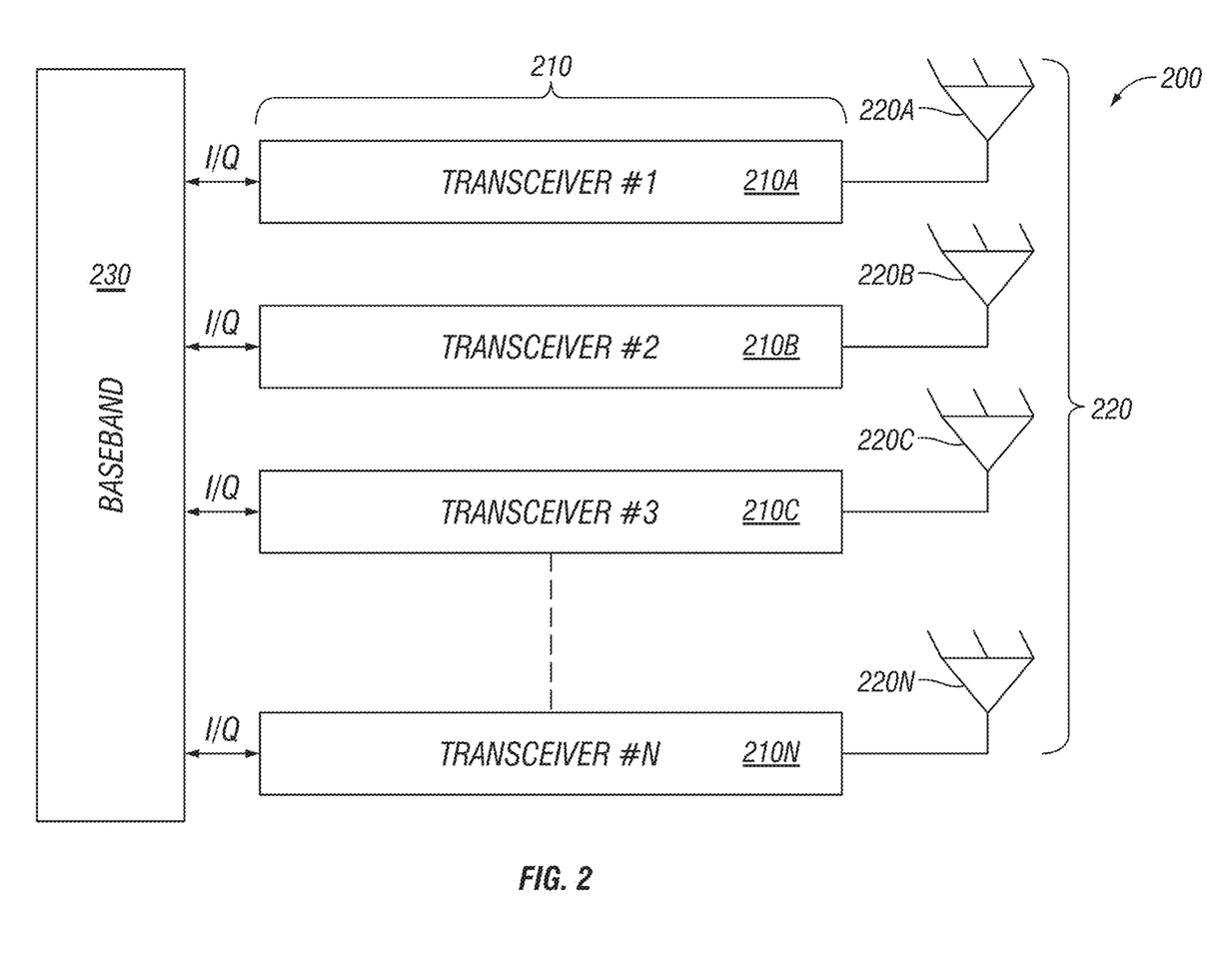
FIG. 2 illustrates a block diagram of an antenna array for use with an RF front-end as disclosed herein and having multiple transceivers.

Turning now to FIG. 2, illustrated is a block diagram of an antenna array 200 for use with an RF front-end as disclosed herein, and having multiple transceivers with corresponding multiple antennas. In this embodiment, a first transceiver 210A, a second transceiver 210B, a third transceiver 210C, and an Nth transceiver 210N (collectively transceivers 210) are illustrated, emphasizing that any number of transceivers 210 may be employed. In addition, a first antenna 220A, a second antenna 220B, a third antenna 220C, and an Nth antenna 220N (collectively 220) may each be respectively coupled to the multiple transceivers 210. Each of the multiple transceivers 210 are also coupled to a back-end baseband circuit 230 for processing of the signals passing through the transceivers 210.

By providing multiple transceivers in a single RF front-end as disclosed herein, a formed antenna pattern to optimize communication path may be provided. This in turn improves point-to-point security, as well as being able to provide multiple-in-multiple-out (MIMO) capabilities. Additionally, multiple receivers and transmitters can be used in cooperation with each other to create beam-forming transmit and receive communications systems. The amplitude and phase of the transceivers 210 can be controlled to steer the electromagnetic beam produced by the antenna array 220 according to the array factor equation in antenna array theory.

Figure 3:
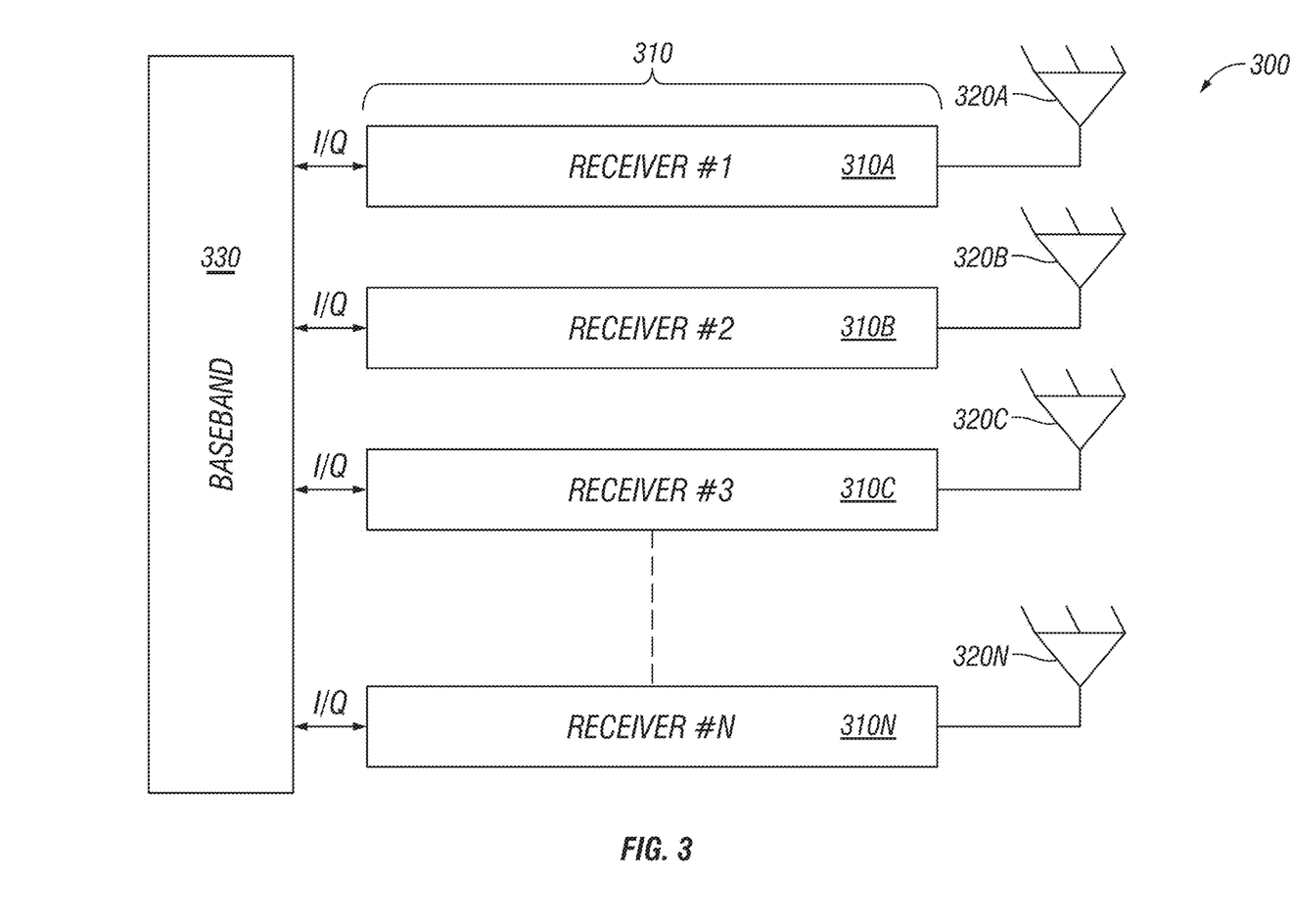
FIG. 3 illustrates a block diagram of an antenna array for use with an RF front-end as disclosed herein and having multiple receivers.

Turning now to FIG. 3, illustrated is a block diagram of an antenna array 300 for use with an RF front-end as disclosed herein, and having multiple receivers with corresponding multiple antennas. In this embodiment, a first receiver 310A, a second receiver 310B, a third receiver 310C, and an Nth receiver 310N (collectively receivers 310) are illustrated, emphasizing that any number of receivers 310 may be employed. In addition, a first antenna 320A, a second antenna 320B, a third antenna 320C, and an Nth antenna 320N (collectively 320) may each be respectively coupled to the multiple receivers 310. Each of the multiple receivers 310 are also coupled to a back-end baseband circuit 330 for processing of the signals passing through the receivers 310.

By providing multiple receivers 310 in a single RF front-end as disclosed herein, the directional detection of various incoming signals can be provided. In such embodiments, the direction of arrival of a signal can be determined from the relative phase of the I/Q outputs, as determined by the baseband circuitry 330.

Communications systems employing an RF front-end in accordance with the disclosed principles can employ spread spectrum techniques for provided increased security. Such techniques may be implemented using the optional first and second inputs 130, 131 discussed above, along with implementing the first and second optional mixers 122, 123 to mix with the signals from the first and second inputs 130, 131. The objective of employing spread spectrum techniques is to increase the transmission bandwidth with respect to the modulating signal bandwidth. Thus, spread spectrum techniques take a signal generated with a particular bandwidth and spreads the signal in the frequency domain, resulting in a signal with a wider bandwidth. One of the purposed of employing spread spectrum signal processing is to provide security to the generated/transmitted signals. This is because the spread spectrum signal may be generated with a security code, and thus the same code is required to recover and interpret the signal. For example, the code is used by both a receiver 101 and transmitter 102 as described above to secure the signals for the first and second synthesizers 132, 133. Two Spread Spectrum techniques that may be employed with an RF front-end as disclosed herein are frequency hopping and direct sequence, and an example of each is discussed below.

Figure 4:
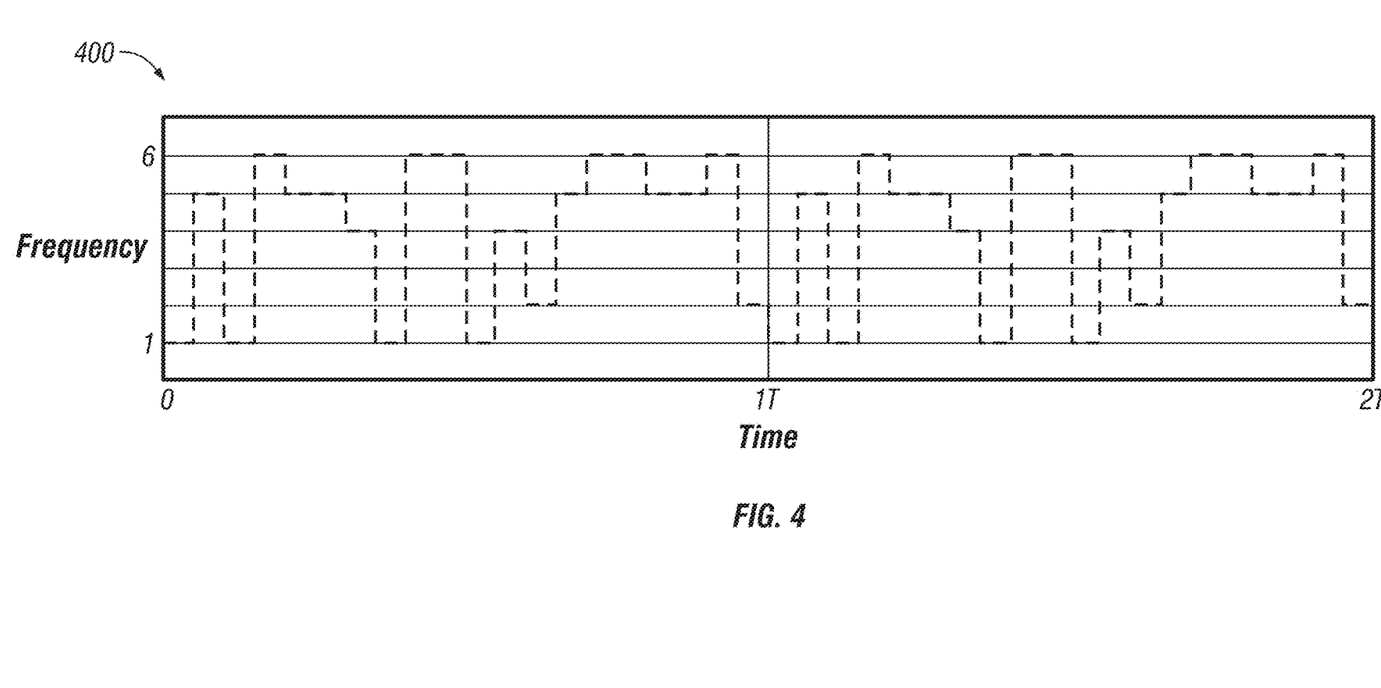
FIG. 4 illustrates a plot of frequency over a given time period illustrating an exemplary frequency hopping spread spectrum signal generated (and decoded) by an RF front-end as disclosed herein.

Looking at FIG. 4, illustrated is a plot 400 of frequency over a given time period and which illustrates an exemplary frequency hopping spread spectrum signal generated (and decoded) by an RF front-end as disclosed herein. Frequency hopping spread spectrum transmission involves changing the carrier frequency between multiple frequencies within a given bandwidth. Moreover, an RF front-end as disclosed herein may use any type of signal frequency modulation.

Using an RF front-end as disclosed herein, the signal generated by the front-end is hopped among frequencies within the available transmission bandwidth and is made on a predetermined or a deterministic schedule so that the signal can be received by another RF front-end. When information is coded into the frequency hopped signal, the "code", which is the predetermined schedule as well as which frequencies at a given time are used, is provided to the receiving RF front-end. In the illustrated plot 400, an exemplary signal is generated by "hopping" the signal among frequencies denoted from level 1 to level 6, and this hopping is done within a first time period 1T. Similarly, from time period 1T to time period 2T, the generated signal is again hopped in exactly the same manner as for the first time period 1T, and then this frequency hopping pattern is repeated for each such time period. The pattern of both the various frequencies among which the signal was hopped, as well as the time within a given time period the signal is held at each such frequency, is provided to the receiving RF front-end system so that the received frequency hopped signal can be "decoded." With the original frequency hopping coding known by the receiving RF front-end, the information coded on the transmitted signal can be recovered.

As it is well known that frequency hopped spread spectrum signals are highly resistant to deliberate jamming, unless the adversary has knowledge of the frequency-hopping pattern, an RF front-end as disclosed herein can provide an array of military anti jamming uses, and in a more efficient manner that permitted by conventional RF front-ends. Moreover, when combined with an omni-directional broadband low distortion antenna such as the antenna disclosed in co-pending U.S. Provisional Patent Application No. 63/044,423, filed Jun. 26, 2020, and co-pending U.S. patent application Ser. No. 17/300,418, filed Jun. 23, 2021, identified above, the frequency-hopping pattern generated by the disclosed RF front-end can be spread among a much larger bandwidth given this unique antenna's large instantaneous bandwidth covering up to 6 GHz within the 2-12 GHz frequency range. Of course, the disclosed RF front-end may also be used with conventional antenna structures as well.

Figure 5:
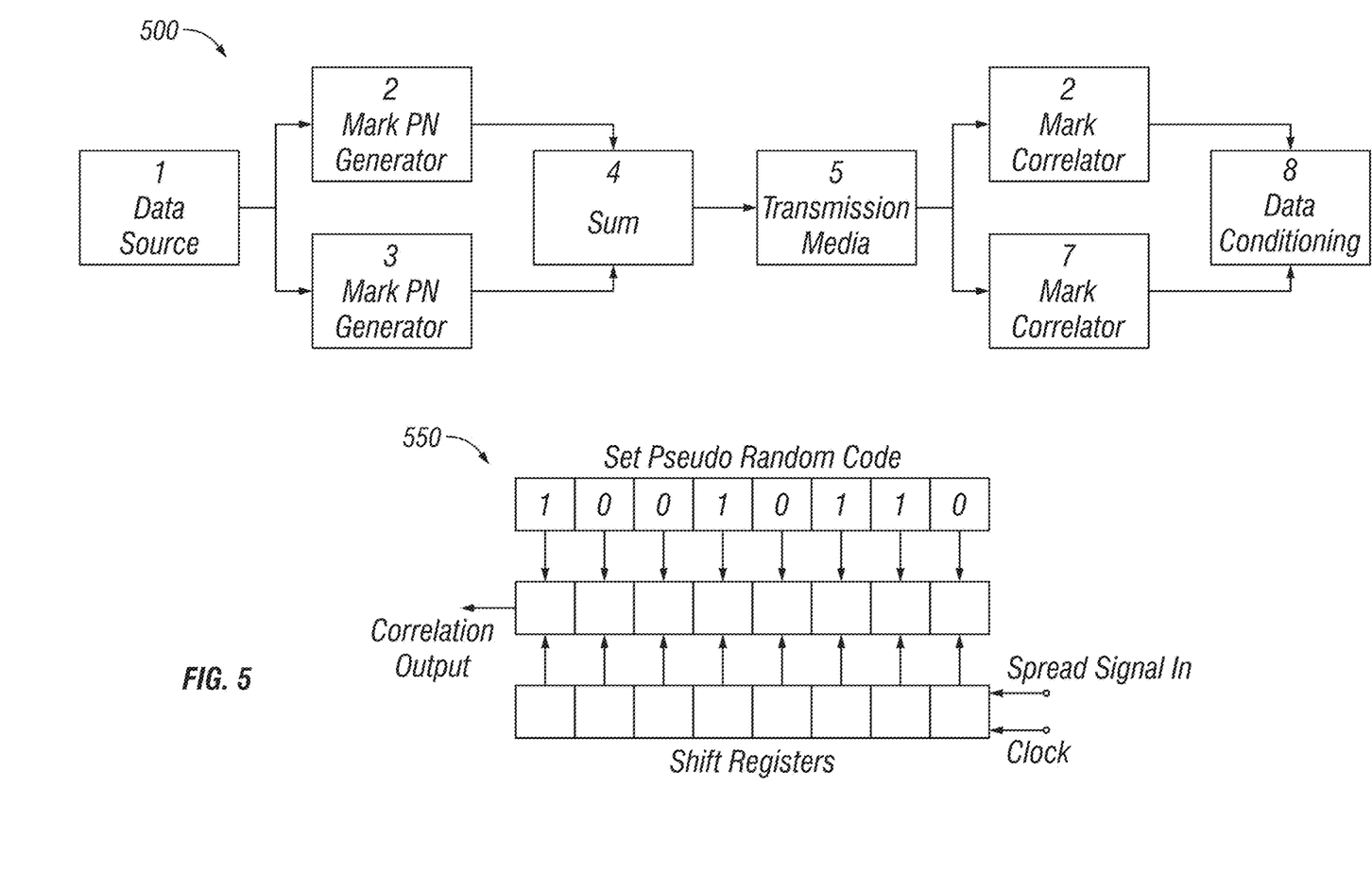
FIG. 5 illustrates a block diagram of a direct sequence spread spectrum signal generation that may be accomplished using an RF front-end as disclosed herein.

Referring now to FIG. 5, illustrated is a block diagram 500 of a direct sequence spread spectrum signal generation that may be accomplished using an RF front-end as disclosed herein. A data source 1 may be mixed together with the pseudo-noise (PN) code generated by a mark PN generator 2, a space PN generator 3, and a summer 4 in a transmitter of the type disclosed herein to produce a spread spectrum output. That output may be sent to a transmission media 5, which may include empty space or any other environment. The spread spectrum signal may be de-spread in a receiver as disclosed herein by mixing it together with a time synchronized PN sequence of the same type as created in the transmitter through the use of a mark correlator 6 and a space correlator 7 in order to deliver the received data to a data conditioning block 8. The mark correlator 6 and space correlator 7 output is shown in block diagram 550 that represents one embodiment of determining the time of arrival for a certain PN code relative to the clock input and the spread signal input into the correlator. When the correlator shown in diagram 550 receives the "Set Pseudo Random Code" through the "Spread Signal In", the correlation output will be maximized, which indicates that the intended signal has arrived at a specific time.

Figure 6:
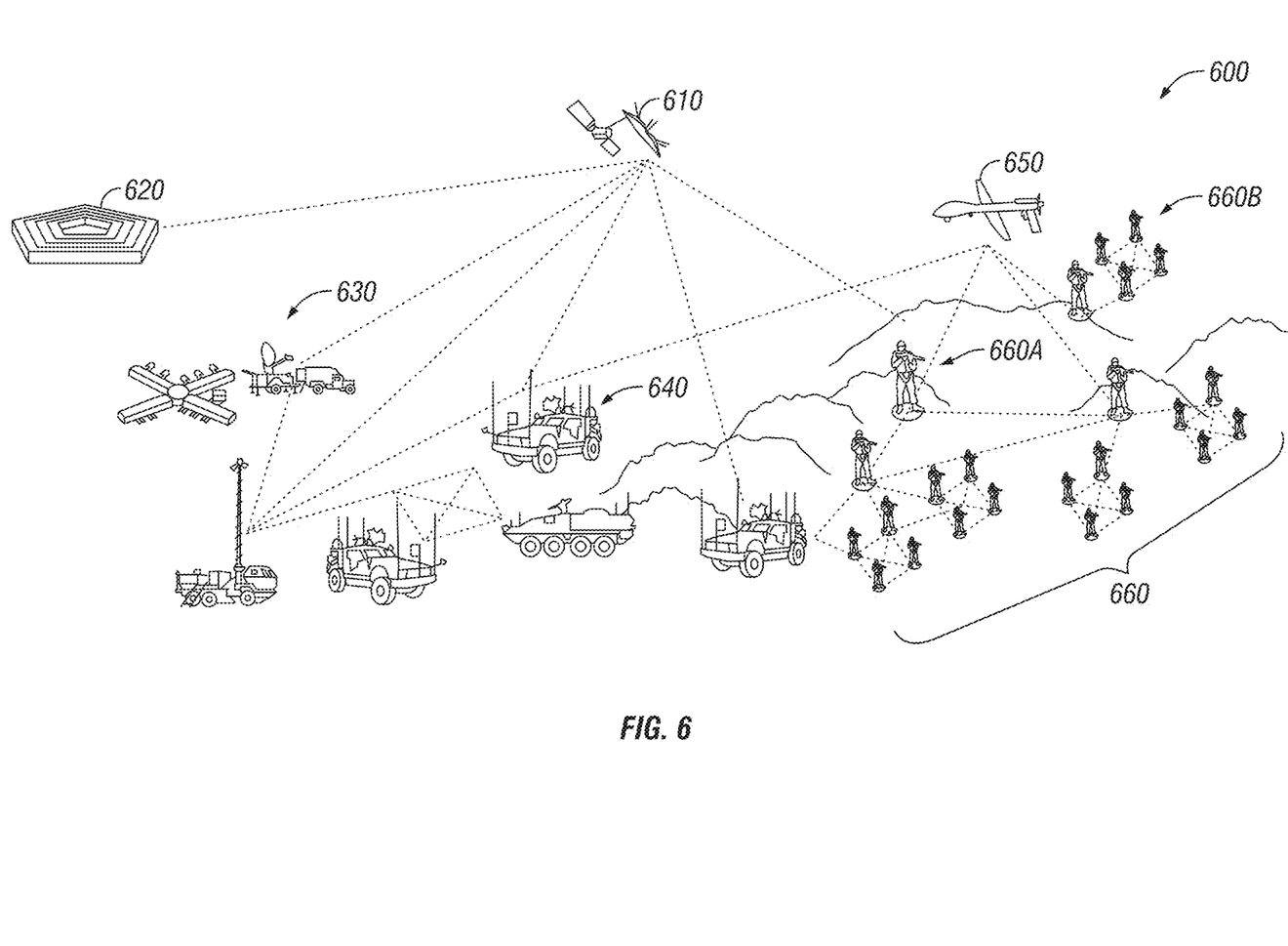
FIG. 6 illustrates an image that demonstrates multiple exemplary military applications achievable with a single antenna or antenna array according to the disclosed principles based on its large instantaneous bandwidth within the 2-12 GHz frequency range.

Looking now at FIG. 6, illustrated is an image 600 that demonstrates the multiple military applications achievable with a single antenna or antenna array according to the disclosed principles based on its ultrawide bandwidth of 2-12 GHz. The disclosed antenna may be paired with a corresponding RF front-end system (described in the above-identified related U.S. patent application Ser. No. 17/300, 416, filed Jun. 23, 2021) and mounted on a single vehicle, such as a military aircraft 610. FIG. 6 illustrates an exemplary network of various wireless communications that may be employed by military personnel, where an antenna or array of antennas as disclosed herein may be implemented. More specifically, these various implementations may be done with the same, single embodiment of a disclosed antenna based on its uniquely expansive instantaneous available bandwidth of 2-12 GHz.

With conventional wideband antennas, the smaller instantaneous available bandwidth as compared to the disclosed antenna require multiple systems, each having its own antenna and small bandwidth range, in order to achieve the various illustrated military applications. Therefore, the compact nature of not only an antenna as disclosed herein, but also the fact that only a single RF front-end system (as disclosed in the related patent application reference above) having a disclosed antenna is needed for such various implementations, allows wireless communications systems implementing the disclosed principles to be made compact enough for individual soldiers to carry, as well as occupying minimal space in military vehicles and equipment.

Looking at the exemplary military implementations illustrated in FIG. 6, a satellite or satellite system 610 is typically employed to relay wireless communications to and from a military headquarter location, such as the Pentagon 620. These satellites can include Wideband Global SATCOM (WGS), Mobile User Objective System (MUOS), and other satellites and satellite networks, each of which may employ significantly different bandwidths, due to the unconventional ultrawide 2-12 GHz instantaneous bandwidth available with the technology described herein.

Exemplary military mission applications achievable with a single antenna/system as provided herein include communications across the Warfighter Information Network-Tactical (WIN-T) platforms. Moreover, the bandwidth of a single disclosed antennas/systems can operate both on equipment and vehicles employing the WIN-T Increment 1 ("At-the-Halt") platform 630 and on equipment and vehicles employing the WIN-T Increment 2 ("On-the-Move") platform 640. Also, military mission applications for the disclosed technology can include ariel implementations 650, such as manned aircrafts and unmanned combat aerial vehicle (UCAV—"drones"). Furthermore, the disclosed technology may be implemented with dismounted soldiers 660. These include Handheld, Manpack and Small Form Fit (HMS)

packs carried by various dismounted soldiers 660A, including the HMS packs carried by riflemen 660A.

Additionally, exemplary military applications achievable with a single antenna/system as provided herein include air-to-air target detection/tracking, Synthetic-Aperture Radar (SAR) with effective Battle Damage Assessment (BDA), cruise missile detection/tracking, drone detection/tracking, and ground moving target detection on both land and water. Moreover, wirelessly linked aircraft may have an antenna/antenna array using the disclosed principles, where only one aircraft need have the disclosed technology, and then communicate the obtained information to other aircraft. Of course, numerous other military applications are also possible with an antenna and associated system as provided herein where the instantaneous bandwidth of up to 3.5 GHz within the 2-12 GHz wireless frequency range provided by the disclosed principles provides a strategic advantage. Other larger instantaneous bandwidths and frequency ranges may also be chosen based on the application needs and the sub-components of the RF front-end.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary of the Invention" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A radio frequency (RF) front-end, comprising:
    a receiver having a first coding mixer configured to mix a coding input signal and a signal from a first synthesizer comprising a first center frequency of a RF input signal to generate a first code injected signal; and
    a transmitter having a second coding mixer configured to mix the coding input signal and a signal from a second synthesizer comprising a second center frequency of a RF output signal to generate a second code injected signal.

2. The RF front-end of claim 1, wherein the first or second coding mixer is configured to be disabled if a corresponding coding input signal is not present, and wherein when the first or second coding mixer is disabled, output from the first or second synthesizer bypasses the corresponding first or second coding mixer.

3. The RF front-end of claim 2, wherein the first or second coding mixer is disabled using a DC bias voltage, wherein phase shift of the output from the corresponding first or second synthesizer is 0° for a positive DC bias voltage and 180° for a negative DC bias voltage.

4. The RF front-end of claim 1, wherein the coding input signal provides a spreading sequence signal generated by a digital signal processing system.

5. The RF front-end of claim 4, wherein the first or second coding mixer mixes a corresponding coding input signal and the output from the corresponding first or second synthesizer to provide pseudo noise coding on the first and second code injected signals.

6. The RF front-end of claim 1, wherein the receiver further comprises a low-noise amplifier configured to receive the RF input signal, and to provide an amplified analog RF input signal to a demodulator.

7. The RF front-end of claim 1, wherein the first center frequency and the second center frequency are separated by at least 1 GHz.

8. The RF front-end of claim 1, wherein the RF input signal received comprises an instantaneous bandwidth no less than 1 GHz.

9. The RF front-end of claim 8, wherein the RF output signal transmitted comprises an instantaneous bandwidth, no less than 1 GHz, that does not overlap the instantaneous bandwidth of the RF input signal received.

10. The RF front-end of claim 1, wherein the receiver further comprises:
    an I-channel mixer configured to down-convert an I-channel component of the RF input signal; and
    a Q-channel mixer configured to down-convert a Q-channel component of the RF input signal.

11. The RF front-end of claim 10, wherein the receiver further comprises:
    an I-channel filter coupled between the I-channel mixer and a first receiver output, and configured to remove harmonics from the down-converted I-channel component; and
    a Q-channel filter coupled between the Q-channel mixer and a second receiver output, and configured to remove harmonics from the down-converted Q-channel component.

12. The RF front-end of claim 11, wherein the transmitter further comprises:
    the I-channel filter coupled between a first transmitter input and the I-channel mixer, and configured to remove harmonics from the I-channel component from a digital-to-analog converter (DAC); and the Q-channel filter coupled between a second transmitter input and the Q-channel mixer, and configured to remove harmonics from the Q-channel component from the DAC.

13. The RF front-end of claim 1, wherein the transmitter further comprises:
an I-channel mixer configured to up-convert an I-channel component for the RF output signal; and
a Q-channel mixer configured to up-convert a Q-channel component for the RF output signal.

14. The RF front-end of claim 1, wherein the transmitter further comprises:
a pre-amplifier receiving the RF output signal from a power combiner; and
a power amplifier receiving the RF output signal from the pre-amplifier and providing the RF output signal to the RF output.

15. The RF front-end of claim 1, wherein one or both of the receiver and the transmitter is semi-symmetric.

16. The RF front-end of claim 1, wherein the RF input or the RF output is coupled to a corresponding transmit/receive switch, which is coupled to an antenna.

17. A radio frequency (RF) front-end, comprising:
a receiver having:
an RF input configured to receive an analog RF input signal via an antenna;
a demodulator comprising:
a power divider configured to divide the RF input signal into an I-channel component and a Q-channel component,
a first I-channel mixer configured to down-convert the I-channel component of the RF input signal,
a first Q-channel mixer configured to down-convert the Q-channel component of the RF input signal, and
a first phase quadrature device providing phase separation between the down-converted I and Q channel components via the first I-channel mixer and the first Q-channel mixer, respectively;
a first coding mixer configured to mix a first coding input signal and a signal from a first synthesizer comprising a first center frequency of the RF input signal to generate a first code injected signal;
a first local oscillator gain amplifier driving the first phase quadrature device based on the first code injected signal or the signal from the first synthesizer;
a first receiver output providing the down-converted I-channel component to an I-channel of an analog-to-digital converter (ADC);
a second receiver output providing the down-converted Q-channel component to a Q-channel of the ADC; and
a transmitter having:
a first transmitter input receiving the I-channel component for an analog RF output signal from an I-channel of a digital-to-analog converter (DAC);
a second transmitter input receiving the Q-channel component for the analog RF output signal from a Q-channel of the DAC;
a modulator comprising:
a second I-channel mixer configured to up-convert the I-channel component for the RF output signal,
a second Q-channel mixer configured to up-convert the Q-channel component for the RF output signal,
a second phase quadrature device providing phase separation between the up-converted I and Q channel components via the second I-channel mixer and the second Q-channel mixer, respectively;
a power combiner configured to combine the up-converted I-channel and Q-channel components into the analog RF output signal;
a second coding mixer configured to mix a second coding input signal and a signal from a second synthesizer comprising a second center frequency of the RF output signal to generate a second code injected signal;
a second local oscillator gain amplifier driving the second phase quadrature device based on the second code injected signal or the signal from the second synthesizer; and
an RF output configured to transmit the analog RF output signal via the antenna.

18. The RF front-end of claim 17, wherein the first or second coding mixer is configured to be disabled if the corresponding first or second coding input signal is not present, and wherein when the first or second coding mixer is disabled, output from the first or second synthesizer bypasses the corresponding first or second coding mixer.

19. The RF front-end of claim 17, wherein the first or second coding input signal provides a spreading sequence signal generated by a digital signal processing system.

20. The RF front-end of claim 19, wherein the first or second coding mixer mixes the corresponding coding input signal and the output from the corresponding the first or second synthesizer to provide pseudo noise coding on the corresponding first or second code injected signal provided to the corresponding first or second local oscillator.

* * * * *